Figure 6:
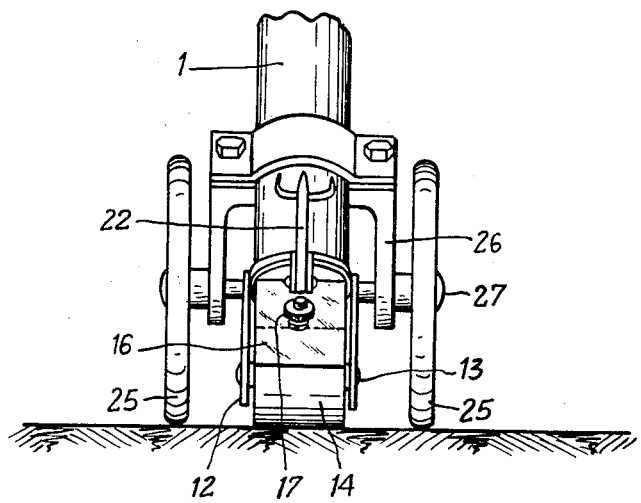

Dec. 3, 1963     R. B. ARRAULT     3,112,512
APPARATUS FOR DRAWING ON THE GROUND BROAD
STRIPES OF PAINT OR THE LIKE MATERIAL
Filed Jan. 15, 1962                    2 Sheets-Sheet 1
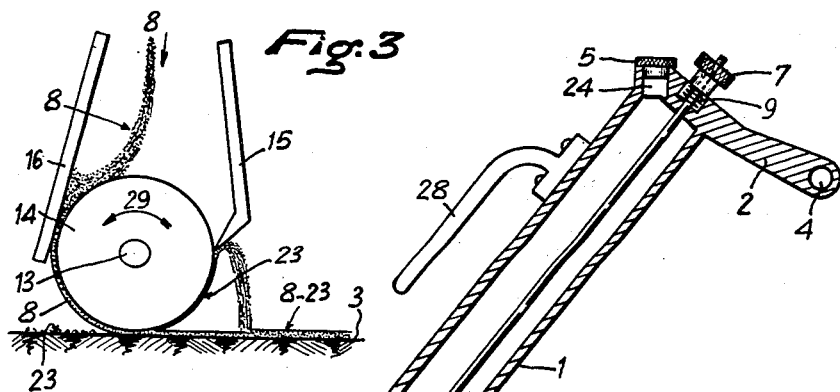
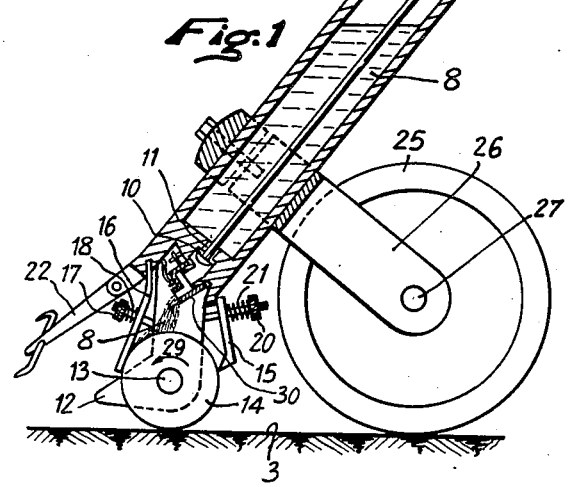
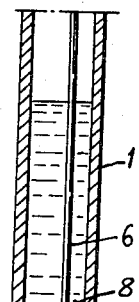
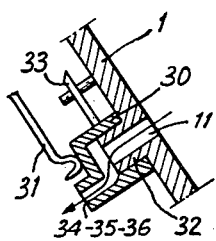
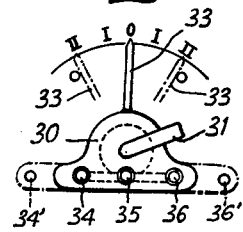
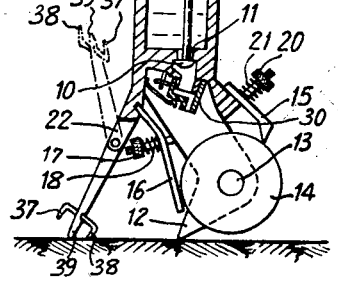
INVENTOR
RAYMONDE BLANCHE ARRAULT
BY Irvin S. Thompson
ATTORNEY INVENTOR
RAYMONDE BLANCHE ARRAULT
BY Irvin S. Thompson
ATTORNEY 3,112,512
APPARATUS FOR DRAWING ON THE GROUND BROAD STRIPES OF PAINT OR THE LIKE MATERIAL
Raymonde Blanche Arrault, 17 Ave. Fernand Lefebvre, Poissy, Seine-et-Oise, France
Filed Jan. 15, 1962, Ser. No. 166,221
Claims priority, application France Jan. 20, 1961
1 Claim. (Cl. 15—503)

My invention has for its object an apparatus for drawing on the ground very broad stripes of paint or the like material through the agency of a tracing roller, of a distributing blade, and of an angularly adjustable trough.

The angularly set trough allows distributing the paint over the tracing roller more or less towards the right hand side or towards the left hand side, according to requirements, when the ground is convex after the manner of a barrel-road.

During short stoppages, for instance during the filling of the apparatus, the latter is set upright through a mere rocking of suitable props. In said upright position, the tracing roller is raised above the ground. The props provided on the apparatus serve also for steering the apparatus over the ground during operation.

For a protracted stoppage, the apparatus may remain in its upright position or be suspended through its handle to any suitable wall.

When it is desired to draw interrupted stripes, it is sufficient to depress intermittently, during progression, the guiding handle so as to make the apparatus rock round the axis of its carrier wheels. Thus, the roller is raised above the ground, and consequently it deposits no paint or the like material onto the ground. When the handle is released, the application of paint is resumed.

The wheels of the apparatus may be removed so as to allow execution of certain operations, for instance when it is desired to obtain large paint-covered areas. In such a case, the apparatus may be raised through a special handle which allows shifting the apparatus easily without it engaging the ground.

In the accompanying drawings given by way of example:

FIG. 1 is a partly sectional elevational view of the apparatus when operative,

FIG. 2 illustrates the same apparatus as FIG. 1, the apparatus being shown in its inoperative condition without its wheels, FIG. 3 is a diagrammatic view of the roller distributing stripes of paint over the ground, FIG. 4 shows an angularly adjustable trough incorporated with the apparatus and which allows directing the paint onto the stripe tracing roller, FIG. 5 illustrates the same angularly adjustable trough seen in elevational view, and FIG. 6 is a side view of the apparatus.

To an elongated container 1 (FIG. 1) is secured the handle 2 adapted to direct the apparatus over the ground at 3. Said handle serves also as a cover for the container and is provided with a filling port 24 closed by a plug 5 and with an opening 4 for suspending the apparatus when required.

A central rod 6 extending through the container carries an adjustable nut 7 screwed down to a varying extent and allows a predetermined amount of paint 8 to pass through the port 11 controlled by the valve 10 at the lower end of the rod 6 when the nut 7 is depressed with the rod. The paint drops then onto the roller 14 as illustrated at 8 in FIGS. 1 and 3. A spring 9 closes automatically the port 11 (FIG. 2) as soon as the nut 7 and the rod 6 are released.

To the lower end of the container 1 are also pivotally secured two flanges 12 carrying a spindle 13 round which the roller 14 revolves freely. Said flanges are constituted in a manner such that they may be angularly shifted so as to engage the ground while preventing the roller 14 from touching the ground (FIG. 2) when the apparatus is inoperative, the third point of engagement with the ground being then obtained through the prop 22.

The prop 22 is provided at its outer end with a fork terminating with two sloping guides 37 and 38 the spacing of which is adjusted to match the breadth of the stripe to be painted or to be repainted while its central tip 39 allows following a line previously drawn on the ground.

The prop guiding the apparatus over the ground may be folded so as to allow bringing the apparatus nearer a hindrance as illustrated in dot and dash lines in FIG. 2 or else, it may collapse into a recess formed in the apparatus.

To the container 1 are also secured a spring-urged blade 16 engaging the front of the roller 14 and a cleaning scraper 15 engaging the rear of said roller (FIGS. 1 and 3). The nuts 17 and 20 serve for adjusting the pressure of said blade and said scraper over the roller 14 through the agency of their springs 18 and 21.

The container 1 carries also carrier wheels 25 through the agency of collapsible straps 26. Said wheels revolve freely round their spindle 27 fitted across said straps. Lastly, a handle 28 allows carrying the apparatus when the wheels and their straps are removed, so as to allow spraying paint over large areas; for light apparatus, wheels are in fact unnecessary.

When tracing a stripe, it is sufficient to make the apparatus progress over the ground 3 by depressing the nut 7. The valve 10 allows then the paint 8 to pass through the port 11 to an extent defined by adjustment of the nut 7. During said movement, the roller 14 rotates in the direction of the arrow 29 whereby the paint 8 dropping onto it is distributed by the blade 16 throughout the length of the roller (FIGS. 1 and 3).

The roller then lays the paint over the ground surface. If the ground is laden with dust or the like non-adhesive material 23, said dust or the like material may rise partly with the roller 14, whereby after a few revolutions, the roller would be fouled if the cleaning scraper 15 were not provided as shown in FIG. 3. In order to prevent any fouling of the roller 14, said scraper 15 engages the latter so as to hold back the non-adhesive material and to make it drop back onto the ground, as illustrated in FIG. 3.

Scraper 15 effectively cleans the roller once per revolution so that it is not essential to previously sweep the ground.

The speed of progression over ground depends on the fluidity of the paint to be used and on its throughput as adjusted by the nut 7.

The breadth of the stripes obtained depends on the breadth of the implements resorted to, and said breadth may be modified in fact as desired, through a mere change of said implements. Of course, all the implements, to wit the blade, roller and scraper may be hard or elastic as desired, according to the nature of the ground or the grade of the paint; they may also be grooved, concave or convex as desired. If required, the blade 16 may be constituted by a plurality of blades acting on the roller 14, each blade exerting its pressure on the roller 14 independently of the other blades.

In the case of a convex road along which the apparatus progresses in a slanting position, the paint 8 should be shifted upwardly along the stripe tracing roller 14. To this end a trough 30 (FIGS. 4 and 5) held in position by a spring 31, is fitted over the ported projection 32 extending beyond the port 11 in the container 1. The trough may be angularly adjusted by acting on a handle 33 rigid with the trough and adapted to assume any selected position between II and II; the slope given to the trough allows the paint to flow more or less towards one side or the other of the roller through the central and lateral ports 35, 34, 36. Of course, the control of the slope of the trough may be obtained in any other manner within easy reach of the operator's hand.

When the ground is flat and the roller is narrow, it is possible to eliminate the trough which is then unnecessary, while in contradistinction, in the case of a very broad roller, the number of ports 34, 35 and 36 may be increased as required by the length to be given to the roller as shown in dot and dash lines in FIG. 5 at 34' and 36'.

It will be remarked that it is an easy matter after removal or collapsing of the wheels to draw juxtaposed stripes by operating first in one direction and then in the opposite direction, without the wheels hindering. It is also possible to cover large areas with paint by shifting above said areas the apparatus held by hand at 28 without the wheels interfering.

What I claim is:

In a line-marking machine including an elongated sloping paint container provided with a port at its lower end, a broad roller carried underneath the lower end of the container, and hand-operated means controlling said port, the provision of a blade engaging the surface of the roller to spread the paint dropping onto said roller over the breadth of the latter and means elastically urging said blade against the roller surface, means for adjusting the pressure exerted by the last-mentioned means on the blade, an elongated trough revolvably fitted over the container port coaxially with the port, and extending over the roller to either side thereof along a line parallel with the axis of the latter, said trough being provided with a plurality of distributing ports located at different points of its length above the roller, and a handle for controlling the angular setting of the trough over the port.

References Cited in the file of this patent

UNITED STATES PATENTS

| | | |
|---|---|---|
| 1,566,358 | White | Dec. 22, 1925 |
| 2,696,696 | Tigerman | Dec. 14, 1954 |
| 2,988,763 | Sweet | June 20, 1961 |

FOREIGN PATENTS

| | | |
|---|---|---|
| 262,587 | Great Britain | Dec. 16, 1926 |
| 1,159,307 | France | Feb. 10, 1958 |